Dec. 28, 1926.

W. M. RISTAU, JR 1,612,056

ENGINE

Filed Nov. 3, 1924

INVENTOR.
Wilhelm M. Ristau Jr.,
BY
Geo. P. Kimmel ATTORNEY.

Dec. 28, 1926.  W. M. RISTAU, JR  1,612,056

ENGINE

Filed Nov. 3, 1924     4 Sheets-Sheet 2

INVENTOR.
Wilhelm M. Ristau, Jr.,
BY
Geo. P. Kimmel. ATTORNEY.

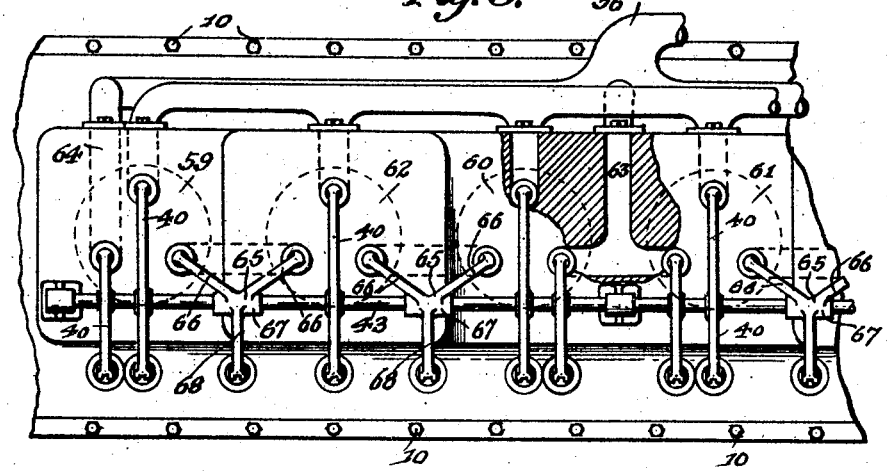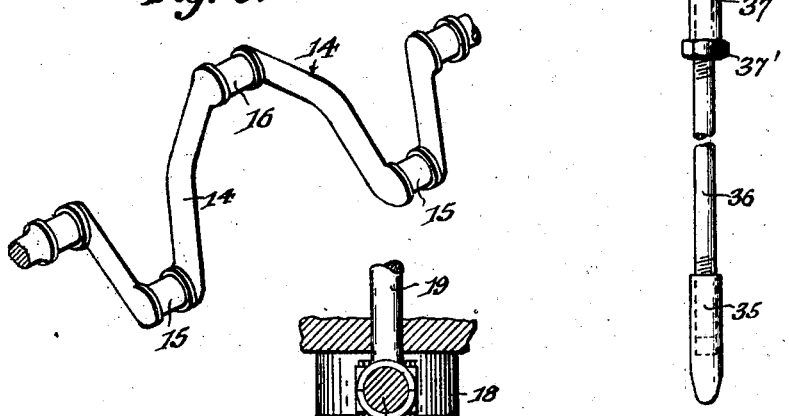

Patented Dec. 28, 1926.

1,612,056

UNITED STATES PATENT OFFICE.

WILHELM M. RISTAU, JR., OF FREDERICKSBURG, TEXAS.

ENGINE.

Application filed November 3, 1924. Serial No. 747,536.

This invention relates to engines and pertains particularly to the class of compound internal combustion engines.

An object of this invention is to provide an internal combustion engine with an auxiliary cylinder associated and connected with the explosion cylinder and designed to receive therefrom the gases produced as a result of the explosion of gasoline therein, to exert the remainder of their expansive force upon a piston contained in the auxiliary cylinder and connected to the crank shaft of the engine, to assist and increase the power of the engine, thereby reducing the consumption of gasoline to lower the cost of operation of the engine.

Another object of the invention is the provision, in a manner as hereinafter set forth, of a compound internal combustion engine having a gas expansion cylinder, into which the gases of the explosion cylinders are passed after the greater amount of their expansive power has been expended upon the pistons therein, to be allowed to further expand and act upon a piston in the auxiliary cylinder to materially increase the efficiency and power of the engine, the said explosion cylinders in addition to exhaust ports connecting them with the auxiliary expansion cylinder, being provided with additional exhaust ports, the valves controlling which are so operated as to open before the limit of the upward gas expelling movement of the piston is reached thereby allowing some of the gases of the explosive cylinders to escape directly to the atmosphere to allow the dead center of the upward movement of the piston to be easily overcome.

Still another object of this invention is to bring about an increase in efficiency in engines of this type by constructing the explosion cylinders and the auxiliary expansion cylinder of the same diameter, and forming the expansion cylinder of greater length than the explosion cylinder to form a chamber in the top thereof in which the gases from the explosion cylinders enter and collect, in a manner as hereinafter set forth.

Still another object of the invention is the provision, in a manner as hereinafter set forth, of an improved valve controlling and operating means by which two valves, each opening into a separate cylinder may be simultaneously operated by a single cam on the cam shaft of the engine, to open both ends of a port connecting the two cylinders together.

A final object of the invention is the provision, in a manner as hereinafter to be set forth, of a compound internal combustion engine of unique design, powerful, efficient, and inexpensive to manufacture.

The invention will be best understood from a consideration of the following detailed description taken in connection with the accompanying drawings forming a part of this specification, with the understanding that the invention is not confined to any strict conformity with the showing of the drawings, but may be changed and modified so long as such changes and modifications mark no material departure from the salient features of the invention as expressed in the appended claims.

In the drawings:

Figure 5 shows in plan a portion of an engine constructed in accordance with this invention, having two sets of explosion cylinders of two cylinders each, each set having an expansion cylinder therebetween, and further showing a modified valve arm structure.

Figure 6 is a perspective view of a crank shaft of the type used in connection with the engine shown in Figure 1.

Figure 7 is a detail elevation of a valve rocker arm lift rod.

Figure 8 is a section taken upon the line 8—8 of Figure 1 showing the relative positions of the explosion engine cylinder crank arm and the expansion cylinder crank arm, and, Figure 9 is a section taken upon the line 9—9 of Figure 1 showing the type of cam used to operate the exhaust valve of the expansion cylinder.

Figure 1:
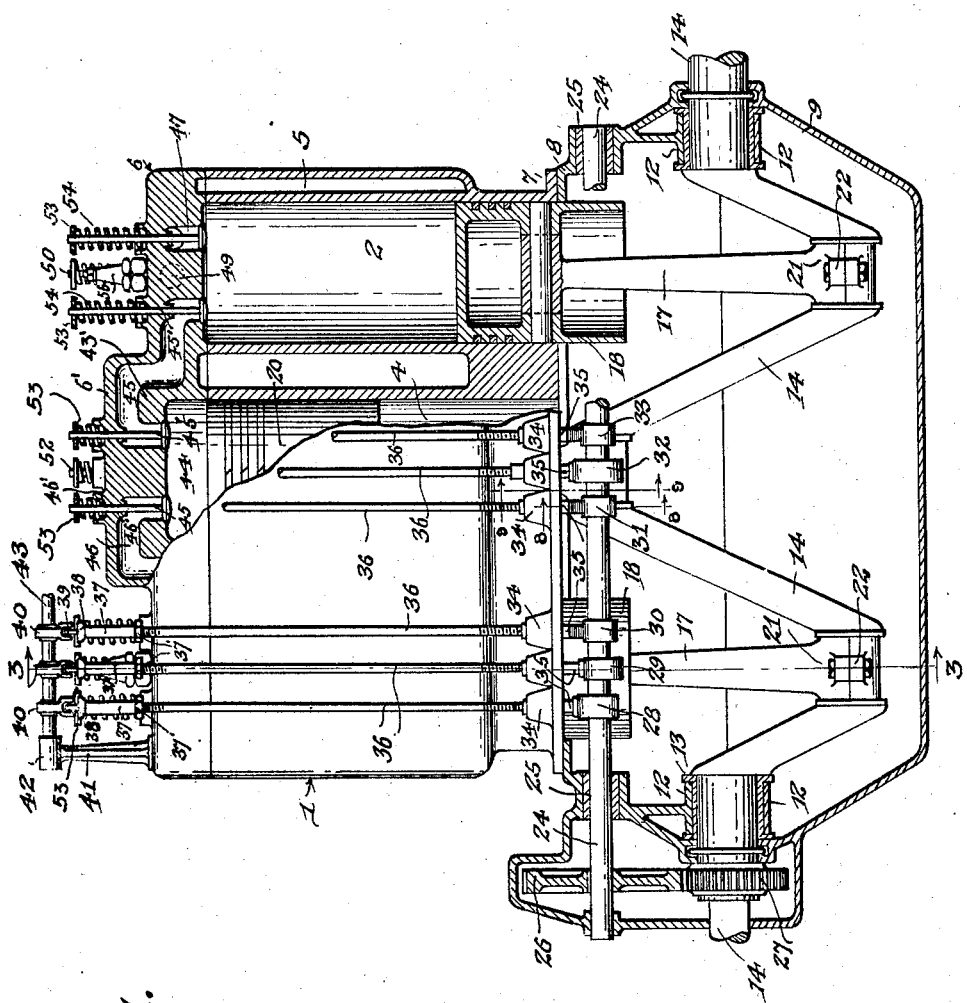
Figure 1 is a view partly in longitudinal section and partly in side elevation of an engine constructed in accordance with this invention showing two explosion cylinders and one expansive cylinder positioned therebetween.

Referring to the drawings in detail wherein like numerals of reference indicate corresponding parts throughout the several views, there is indicated generally by the numeral 1, a three cylinder engine constructed in accordance with this invention, having two explosion cylinders 2 and 3, respectively, and an expansion cylinder 4 located between and in alignment with the explosion cylinder.

While the drawings have been confined to the showing of an engine having two explosion cylinders and one expansion cylinder located therebetween, with the exception of Figure 5, it is to be understood that the structure set forth in connection with this engine and details of construction of the expansion cylinder, is not to be confined to a three cylinder engine of the type shown in Figure 1, but may be used in connection with an engine of any size, as shown in Figure 5, an engine having four explosion cylinders and two expansion cylinders, or a single expansion and a single explosion cylinder may be used together, if desired.

The cylinders 2, 3 and 4 are of the same inner diameter. The chamber formed by the cylinder 4 extends slightly above the upper end of the chamber formed by either of cylinders 2, 3. The lower ends of the chambers formed by the cylinders are in alignment. A single casting common to the upper ends of the cylinder is employed to provide the heads of these latter and which is indicated at 6. The intermediate portion of the castings projects slightly above the end portions thereof. The cylinders are surrounded by a common water jacket 5 therefor. The lower portion of the engine body is surrounded by the outstanding flange 7, which is secured in any appropriate manner to the top of the upper portion 8 of the crank case, this crank case being divided longitudinally providing the lower portion 9, which portions are secured together by means of the nuts and bolts 10 passing through the surrounding abutting flanges 11.

Each end of the upper and lower portions 8 and 9 of the crank case carries a half bearing 12 lined with a bushing 13 and constituting the two main bearings for the ends of the crank shaft, indicated generally by the numeral 14. The crank shaft 14 here shown constitutes a pair of aligned spaced cranks 15 and an intermediate oppositely extending central crank 16, the cranks 15 being connected through the medium of connecting rods 17 with cylinders 18 working in the explosion cylinders 3 and 2, while the central crank 16, is connected by means of the connecting rod 19 with a piston 20 which works in the expansion cylinder 4. The throw of each of the cranks 15 and of the crank 16 is the same, and the diameter of the expansion cylinder 4 is the same as the diameter of the explosion cylinders 3 and 2. The lower end of each of the connecting rods 17 and the connecting rod 19 is formed in two parts at its lower end and connected by means of the bolts 21 which extend through the superposed abutting ears 22 carried by the two halves of the connecting rod.

It will be seen, upon reference to Figures 6 and 8, that the crank shaft is so constructed as to place the cranks 15 out of alignment with the crank 16, so that when the pistons 18 have reached the limit of their downward stroke the crank 16 will be beyond the longitudinal center of the engine and the piston 20 in the expansion cylinder will be starting upon its down stroke.

Figure 9:
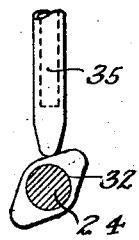
Figure 3:
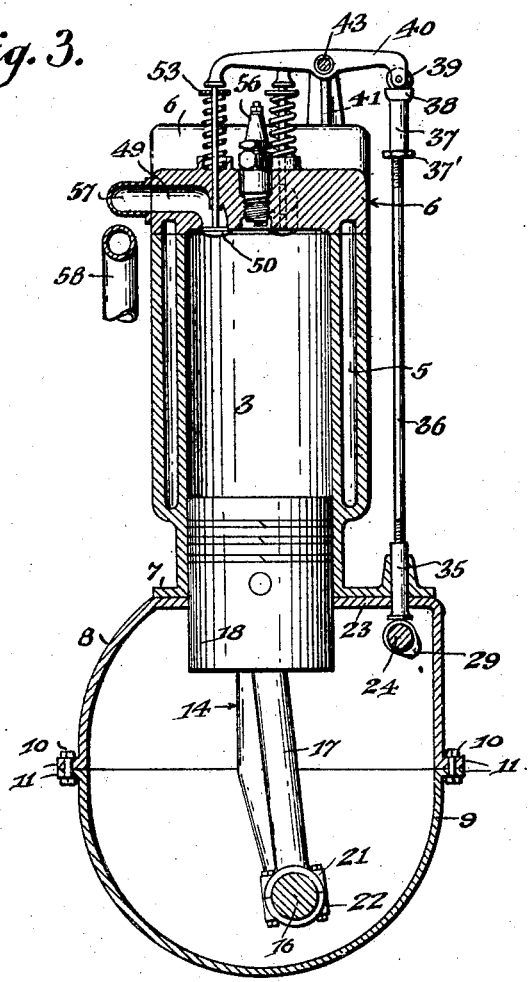
Figure 3 is a transverse section taken upon the line 3—3 of Figure 1.

One side of the upper portion 8 of the crank case is set out and formed at right angles, as shown in Figure 3, forming the upper horizontal portion 23 which extends longitudinally of the engine, and in this portion beneath the horizontal supporting section 23 is positioned the cam shaft 24 which extends longitudinally of the engine and has its ends positioned in bearings 25 carried in the ends of the upper portion of the housing 8. The forward end of the cam shaft carries thereon a gear wheel 26 which meshes with a gear 27 upon the end of the crank shaft 14 and through these gears the proper timing is given to the revolution of the cam shaft 24. Upon the crank shaft, adjacent each of the cylinders 2, 3 and 4, are three cams 28, 29, and 30 respectively, for the explosion cylinders and 31, 32 and 33, respectively, for the expansion cylinder. All of these cams are of the same design, with the exception of the cam 32, which controls the exhaust port of the expansion cylinder, in a manner as hereinafter to be explained, and this cam is doubly pointed as shown in Figure 9, these points being diametrically oppositely positioned as also shown in this figure.

The flange 7, as shown in Figure 3, is of sufficient width to extend across the horizontal portion 23 of the crank case and has formed upon the top thereof the upstanding cone-shaped longitudinally apertured guide sleeves 34. These guide sleeves occur in series of three as shown, on this type of engine, and each is positioned above one of the cams upon the cam shaft 24.

Extending through the guide sleeves 34 are lower lift rod feet 35, those bearing against the cams 30, 31, and 33, being pointed as shown in Figure 1 and those which bear against the cams 28 and 29 are flat as shown in Figure 3. The purpose for pointing certain of the lift rod feet 35 is to cause a quick open and close movement of the valve, which the lift rod extending therefrom controls. Each of the lift rod feet 35 has a longitudinal threaded bore extending downwardly from the top thereof and in this threaded bore the lower end of a lift rod 36 extends. The upper end of each of these lift rods 36 is also threaded for engagement in the threaded longitudinallly extending bore of a head 37. A lock nut 37' is threaded on each lift rod below the head carried thereon, to maintain the head in any adjusted position on the rod. Each of the heads 37 is formed at its upper end to provide the upwardly opening cup member 38 in which is seated the roller 39 carried at the outer end of each of the valve operating rocker arms 40.

Mounted upon the head 6 at each end thereof is a vertical standard 41 terminating at its upper end in the bearing 42, and extending between these standards and having each of its ends supported in said bearings 42 is a revoluble shaft 43 which supports the rocker arms 40.

The cylinder head 6, for use upon an engine of the type shown at 1 in Figure 1, is formed with a central portion 43' extending above the end portions of the head, and this portion 43' has a recess 44 formed in its under side of the same diameter as the cylinder 4 over which it is placed, and this space 44 constitutes a gas collection chamber in which the exhaust gases from the explosion cylinders 2 and 3 pass, as will be described. Opening through the top of this recess 44 and extending in opposite directions through the head to that portion which overlies the cylinders 2 and 3, are exhaust passages 45 and 46 respectively, by means of which the gases resulting from the explosion of the gasoline mixture in the explosion chambers are passed into the expansion cylinder.

These ports 45 and 46 have both their inlet and outlet ends controlled by valves 45' and 46', respectively, and the rocker arms 40 which control these valves have their cams so adjusted that the valves at each end of each of the ports 45 and 46 will open simultaneously.

Opening through the under side of the head 6 into each of the explosion cylinders 2 and 3 is a fuel inlet port 47 controlled by the valves 48, as clearly shown in Figure 1 of the drawings. Each of the explosion cylinders further has opening into the upper end thereof through the head 6 an exhaust port 49, each controlled by valve 50, and the expansion cylinder also has opening thereinto through the portion 43 of the head, an exhaust port 51 controlled by the valve 52.

Each of the cylinders 2 and 3 has associated therewith a spark plug 56, and positioned about the stem of each of the valves controlling the ports of the two explosion cylinders and the expansion cylinder, is an expansion spring 54, the lower end of each of which is positioned in a cup 55 formed integral with the head 6. The upper end of each of the valve stems carries a plate 53 which retains the upper end of the spring in position. The inner end of each of the rocker arms 40 bears against the upper end of a valve stem.

The ports 49 and 51 open out upon the side of the cylinder head 6 and there is secured to the side of the cylinder head an exhaust pipe 57 which has a series of openings adapted to fit over the outer end of the exhaust port to carry gases from the cylinders.

An intake manifold 58 is provided for conveying fuel charges to the ports 47 to be fed into the explosion cylinders 2 and 3 upon the opening of the controlling valves 48.

Figure 2:
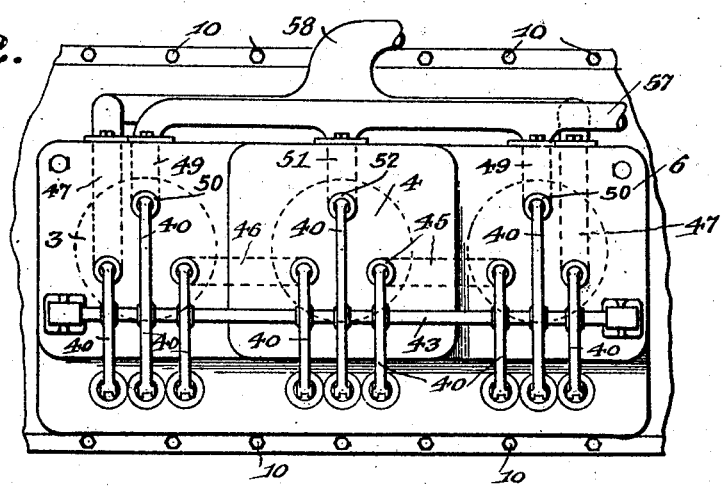
Figure 2 is a top plan view of the engine shown in Figure 1, showing the valve operating mechanism in plan.
Figure 4:
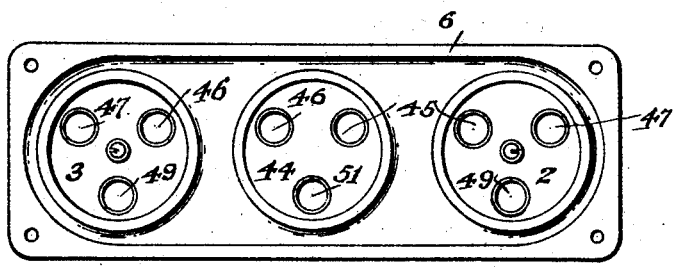
Figure 4 is a bottom plan view of the removed cylinder head of the engine.

Referring now to Figure 5 of the drawings, there is shown the top plan view of an engine constructed with four explosion cylinders and two compound or expansion cylinders. One end only of this engine is shown, showing the forward explosion cylinder 59 and central or intermediate explosion cylinders 60 and 61. Positioned between the cylinders 59 and 60 is an expansion cylinder 62 and likewise on the other side of the cylinder 61 there would be positioned a second expansion cylinder in a showing of the completed engine. This second expansion cylinder is not shown in this drawing. When such engine construction is employed, the two explosion cylinders 60 and 61 coming side by side are fed from a single intake port 63, the end cylinder 59, being one of them, being fed through a port 64 similar to the intake port 47 in Figure 2.

In this view there is shown a modification of certain of the rocker arms, for there is here shown a substantially Y-shaped rocker arm 65, the diverging arms 66 of which merge in a sleeve 67 which is carried upon the shaft 43 and from the center of this sleeve 67 there extends the outwardly projecting arm 68 which carries at its outer end a roller member in the same manner as the rocker arms 40, which roller member seats in the cup 38 in the head of the push rods 36. The remainder of the structure set forth in this Figure 5 is the same as that set forth in the other views of the engine and the same reference numerals will be used upon this structure as upon the structure shown in Figures 1, 2 and 3.

Beginning with the intake stroke of the piston 18 in cylinder 3, piston 18 in cylinder 2 will be about to begin its downward power or explosion stroke. Both pistons, as will be seen are at the same height. On the return upward movement of the pistons the valves 45' will be sharply opened by the cams controlling the same to allow the explosion gases to pass through port 45 into the expansion chamber 44 of the cylinder 4.

The valve 45' remains open only a short time, or until the tension of the gases in the expansion cylinder and the exhausting cylinder are equal, whereupon valve 45' will close and valve 50 of cylinder 2 will open to allow the remaining gas in cylinder 2 to exhaust through port 49, to completely empty cylinder 2.

As the piston in cylinder 2 completes its upward exhaust stroke and begins its downward intake stroke, the piston in cylinder 3 has just finished its compression stroke and will have fired to begin its downward power stroke and the valve mechanism controlling the cylinder 3 will operate in the same manner as described for cylinder 2.

The piston in expansion cylinder 4 makes a power stroke during each exhaust stroke of each explosion cylinder and makes its exhaust stroke during the suction or intake of the cylinder which had exploded and passed its gases into it during its exhaust stroke.

In the use of an engine of the structure shown in Figure 5 where there are four explosion cylinders and two expansion cylinders the engine works as a four cycle engine. The relation between and action of the cylinders is the same as for an engine having two explosion and one expansion cylinders.

It will be seen from the foregoing description that there has been set up a compound internal combustion engine having improved features of construction over engines of this type heretofore produced. Through the action of the additional exhaust valve 50 of the explosion cylinders, which prevents any retardation in the movement of the pistons 18 during the exhaust stroke thereof, and because of the construction of the expansion cylinder 4, of the same diameter as the explosion cylinders and provided with expansion chambers at the head thereof, a greater flexibility in the engine is obtained increasing the ease of action and power thereof, resulting in smoother running and a smaller consumption of fuel.

Having thus described my invention what I claim is:

1. A compound engine comprising a pair of explosion chambers and an expansion chamber positioned therebetween, a casting common to said chambers and providing the heads thereof, the head for the expansion chamber having its lower face recessed to form a continuation of the upper end of said chamber whereby the latter will extend above the upper ends of the explosion chambers, said casting formed with an exhaust port for the expansion chamber and with a pair of oppositely extending channels each leading from the upper end of an explosion chamber and opening into the top of said recess, said channels providing means whereby the major portion of the products of combustion from the explosion chambers are delivered to the expansion chamber prior to the delivery of the remaining portion to the atmosphere from the explosion chambers, said casting further formed with a pair of fuel inlet ports and a pair of exhaust ports for said remaining portion, one of the ports of each pair opening into the top of an explosion chamber, a controlling valve for each end of each of said channels, means for simultaneously operating said valves, a controlling valve for each of said ports, means for operating said last mentioned valves, a piston operating in each of said chambers, a crank shaft connected to said pistons for operating them simultaneously and further for operating the pistons in the explosion chambers in a direction opposite with respect to the direction of operation of the piston in the expansion chamber, the cranks of said shaft being so disposed to cause the piston in the expansion chamber to begin its downward stroke before the limit of the down stroke of the pistons in the explosion chambers to set up a suction in the expansion chamber immediately preceding the exhaust stroke of the pistons in the explosion chambers.

2. A compound engine comprising a pair of explosion chambers and an expansion chamber positioned therebetween, a casting common to said chambers and providing the heads thereof, the head for the expansion chamber having its lower face recessed to form a continuation of the upper end of said chamber whereby the latter will extend above the upper ends of the explosion chambers, said casting formed with an exhaust port for the expansion chamber and with a pair of oppositely extending channels each leading from the upper end of an explosion chamber and opening into the top of said recess, said channels providing means whereby the major portion of the products of combustion from the explosion chambers are delivered to the expansion chamber prior to the delivery of the remaining portion to the atmosphere from the explosion chambers, said casting further formed with a pair of fuel inlet ports and a pair of exhaust ports, for said remaining portion one of the ports of each pair opening into the top of an explosion chamber, a controlling valve for each end of each of said channels, means for simultaneously operating said valves, a controlling valve for each of said ports, means for operating said last mentioned valves, a piston operating in each of said chambers, a crank shaft connected to said pistons for operating the pistons in the explosion chambers in an opposite direction simultaneously with respect to the direction of operation of the piston in the expansion chamber, the cranks of said shaft being so disposed to cause the piston in the expansion chamber to begin its downward stroke before the limit of the down stroke of the pistons in the explosion chambers to set up a suction in the expansion chamber immediately preceding the exhaust stroke of the pistons in the explosion chambers, and that portion of said casting forming the head for the expansion chamber extended above the other portions of said casting which form the heads for the explosion chambers.

3. A compound engine comprising a pair of explosion cylinders and an expansion cylinder arranged therebetween and extending above the explosion cylinders, a valve controlled inlet and valve controlled exhaust port for each explosion cylinder and a valve controlled exhaust port for the expansion cylinder, means to provide a pair of oppositely extending exhaust channels each leading from the top of an explosion cylinder and opening into the top of the expansion cylinder for delivering the major portion of the exhaust from the explosion cylinders to the expansion cylinder prior to the operation of the opening of the valve controlled exhaust ports for the explosion cylinders to discharge the other portion of the exhaust from said explosion cylinders, a controlling valve for each end of each of said channels, operating means for all of said valves, a piston operating in each cylinder, and a crank shaft connected to said pistons for operating the pistons in the explosion cylinders in an opposite direction simultaneously with respect to the direction of the operation of the piston in the expansion cylinder, the cranks of said shaft being so disposed to cause the piston in the expansion cylinder to begin its down stroke before the limit of the down stroke of the pistons in the explosion cylinders to set up a suction in the expansion cylinder immediately preceding the exhaust stroke of the pistons in the explosion cylinders.

In testimony whereof, I affix my signature hereto.

WILHELM M. RISTAU, Jr.